Aug. 15, 1933.     H. G. KAMRATH     1,922,688
MULTISTAGE TYPE AIR CLEANER
Filed June 10, 1929     2 Sheets-Sheet 1

Inventor
Herbert G. Kamrath
By Blackmore, Spencer & Fitch
Attorneys

Aug. 15, 1933.  H. G. KAMRATH  1,922,688
MULTISTAGE TYPE AIR CLEANER
Filed June 10, 1929   2 Sheets-Sheet 2

Inventor
Herbert G. Kamrath
By Blackmore, Spencer & Hrib
Attorneys

Patented Aug. 15, 1933

1,922,688

UNITED STATES PATENT OFFICE 1,922,688

MULTISTAGE TYPE AIR CLEANER

Herbert G. Kamrath, Flint, Mich., assignor to A C Spark Plug Company, Flint, Mich., a Company of Michigan Application June 10, 1929. Serial No. 369,561

4 Claims. (Cl. 183—10)

Air cleaners of the dry or liquid-wetted filter type are much more efficient than those of other types in removing foreign matter from the air to be cleaned. However, when the air to be cleaned contains excessive amounts of foreign matter, simple air cleaners of the filter type are not entirely satisfactory for the reason that, after a comparatively short period of use, they become clogged or otherwise rendered ineffective or inefficient by the foreign matter removed from the air.

The length of time during which the filter element of an air cleaner can be efficiently used before cleaning or replacement is necessary may be greatly increased by providing in the cleaner means whose operation is not materially affected by the foreign matter removed thereby from the air to be cleaned to remove the greater part of the foreign matter from the air before the latter reaches the filter element.

In my copending application, Serial Number 322,848, filed November 30, 1928, there is disclosed an air cleaner of the type described in the preceding paragraph. In the air cleaner disclosed in my copending application, above identified, the current of air to be cleaned is caused to impinge on the surface of a body of oil or other suitable liquid, to which the greater part of the foreign matter carried by the air adheres, before being passed through the filter element, which is, therefore, required to function to remove from the air only the small residue of foreign matter remaining therein. While the air cleaner disclosed in my copending application is generally satisfactory in operation, it has been found that when the current of air which impinges against the surface of the body of liquid is travelling at a high rate of speed, it has a tendency to carry oil with it into the filter element, thus depleting the supply of liquid and clogging or otherwise rendering the filter element inefficient or ineffective.

This invention relates to an improvement in the air cleaner disclosed in my copending application, above identified, and resides particularly, in the provision of means whereby the current of air to be cleaned is prevented from impinging directly against the surface of the body of liquid, which is provided to remove the greater part of the foreign matter from the air, so as to avoid the undesirable consequences of such impingement when the current of air to be cleaned is travelling at a high rate of speed.

For a better understanding of the nature and the objects of the present invention, reference is made to the following specification, in which are described the preferred embodiments of my invention which are illustrated in the accompanying drawings.

Figure 1:
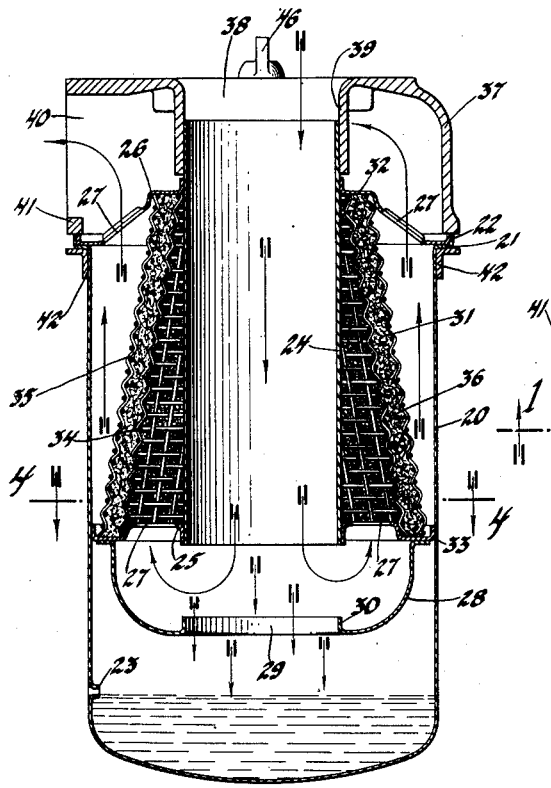
Fig. 1 is a longitudinal section, taken on the line 1—1 of Fig. 2, through an air cleaner in which is embodied the present invention.
Figure 2:
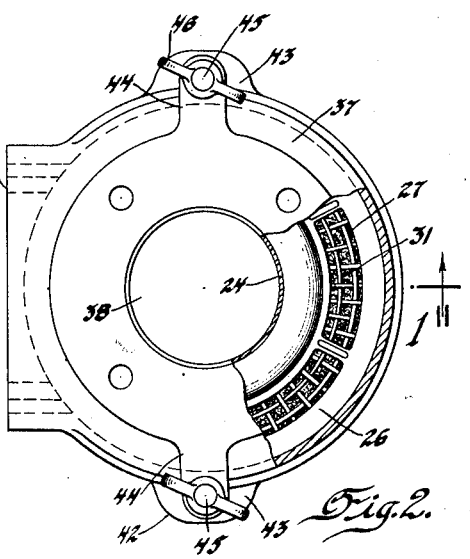
Fig. 2 is a top plan view, with parts broken away and in section, of the air cleaner shown in Fig. 1.
Figure 3:
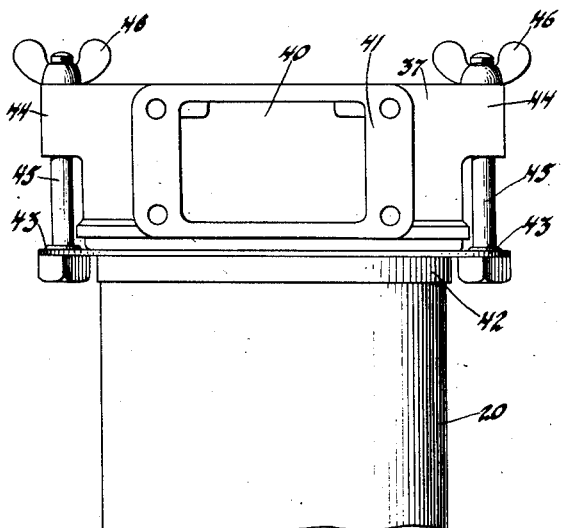
Fig. 3 is a fragmentary side elevation of the air cleaner shown in the preceding figures.
Figure 4:
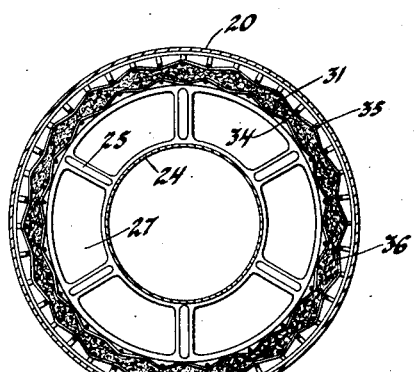
Fig. 4 is a section taken on the line 4—4 of Fig. 1.

In Figures 1 to 4 of the drawings, there is shown an air cleaner, which includes a body portion 20, which, consists of a cylindrical shell which is open at its upper end and closed at its lower end. At the upper end of the body portion, there is provided an outwardly extending annular flange 21 whose outer edge is turned upwardly, as indicated at 22. In the side wall of the body portion, adjacent the lower end thereof, there is provided a small opening 23 for purposes hereinafter specified.

The dust separating element of the air cleaner shown in Figures 1 to 4 of the drawings includes a cylindrical tube 24 whose lower end is surrounded by and secured to an annular spacer 25 of which the outer diameter is such that it will fit snugly within the body portion. A portion of the tube 24 adjacent the upper end thereof is surrounded by and secured to an annular spacer 26 of which the outer diameter is such that it will fit snugly against the inner wall of the flange 22. Through each of the spacers 25 and 26, there extends an annular series of openings 27. To the lower side of the spacer 25, outwardly of the openings 27, there is secured the upper edge of a cup-shaped baffle 28 in whose bottom there is provided an opening 29 surrounded by an upwardly projecting annular flange 30 of substantially the same diameter as and substantially coaxial with the tube 24.

Surrounding the tube 24 and extending from the spacer 25 to the spacer 26 is a frusto-conical dust-collecting element 31 of which the upper edge is seated in an annular rabbet 32 provided in the spacer 26 inwardly of the openings 27 therein, and of which the lower edge is seated in an annular channel 33 provided in the spacer 25 outwardly of the openings 27 therein. As shown in the drawings, the dust-collecting element 31 consists of inner and outer frusto-conical sleeves 34 and 35 of rather coarse mesh wire screen between which is interposed a porous mass of dust-collecting material 36. The dust-collecting material preferably consists of an oil-wetted fabric woven or knitted from flat copper ribbon, such as that disclosed in my Patent No. 1,829,401 which was issued on October 27, 1931, wound around the inner sleeve 34 a sufficient number of times to produce a mass of the desired thickness.

The dust separating element of the air cleaner is of such length and is so proportioned that, as is apparent from the drawings, when the body portion 20 and the dust separating element are assembled with the outer edge of the spacer 25 fitting snugly against the inner side wall of the body portion and the outer edge of the spacer 26 fitting snugly within the annular rabbet formed by the flanges 21 and 22, the lower end of the dust separating element will be located somewhat above the opening 23 and the upper end thereof will extend a considerable distance above the upper end of the body portion 20.

To close the upper end of the body portion of the air cleaner shown in Figures 1 to 4, there is provided a cover member 37 which consists of a generally cup-shaped member through whose closed end there extends a central opening 38 surrounded by an inwardly projecting sleeve 39 and through whose side wall there extends an opening 40 surrounded by an outwardly projecting sleeve 41. The cover portion is, as shown in the drawings, adapted to be assembled with the body portion and the dust separating element, with the edges of the cover member which surround the open end thereof seated on the flange 22 and the outer edge of the spacer 26 so as to prevent movement of the dust separating element with respect to the cover member and the body portion, and with the sleeve 39 snugly fitting around the upper end of the tube 24.

To secure the cover member removably to the body portion, there is provided on the body portion beneath the flange a collar 42 which is of angle shape in cross section. Through ears 43 provided on the horizontal flange of the collar 42 and through suitable lugs 44 provided on the cover member, there extend bolts 45 which, in conjunction with wing nuts 46, secure the cover member and the body portion removably together.

The air cleaner, hereinbefore described, although obviously susceptible of use in other installations is particularly adapted for use in cleaning the air to be supplied to the carburetor of an internal combustion engine which operates in a dust-laden atmosphere and which consumes large quantities of air. The air cleaner, hereinbefore described, was particularly designed for installation on the internal combustion engines of large busses. When used in such an installation, the opening 40 is connected to the air intake conduit of the carburetor and there is preferably connected to the opening 38 a stack which extends to a point adjacent the top of the engine hood where the air is cleanest.

When the air cleaner is in use, the body portion is filled with a non-drying oil or other suitable liquid to the level of the opening 23 which serves to control the level of the liquid within the body portion. During the operation of the engine, the suction produced in the engine cylinders draws air through the opening 38 into the tube 24, and out of the lower end of the tube into the space between the outer wall of the tube and the inner wall of the dust-collecting element 31. The baffle 28 prevents the current of air which flows through the cleaner, in passing from the lower end of the tube 24 into the space between the outer wall of the tube and the inner wall of the dust-collecting element 31, from impinging against the surface of the body of liquid in the bottom of the body portion with such force as to pick up and carry with it a portion of the liquid and, consequently, prevents depletion of the liquid supply and fouling of the dust-collecting element. In passing from the lower end of the tube 24 into the space between the outer wall of the tube 24 and the inner wall of the dust-collecting element 31, the air is required to reverse its direction of travel. The particles of foreign matter in the air being of greater density than the air are incapable of changing their direction of travel as fast as the air, and, consequently, a large proportion of them continue to travel straight downwardly and pass through the opening 29 in the baffle 28 and impinge against and adhere to the surface of the body of liquid in the bottom of the body portion. It will be clear that the opening 23 prevents sufficient pressure being built up in the space between the surface of the body of liquid and the baffle 28 to prevent the entrance of dust particles thereinto.

After being precleaned as described above, the air, as hereinbefore stated, passes into the space between the outer wall of the tube 24 and the inner wall of the dust-collecting element 31. From this space, the suction of the engine cylinders draws the air through the dust-collecting element 31. During the passage of the air through the dust-collecting element, any particles of foreign matter remaining therein are separated from the air and retained by the dust-collecting element. The cleaned air then passes into the space between the outer wall of the dust-collecting element and the inner wall of the body portion, whence it passes into the annular passage within the cover member 37 and thence through the opening 40 into the carburetor and the engine cylinders.

The movement of the air and the particles of foreign matter within the cleaner is clearly indicated by the arrows in Figure 1—the long arrows indicating the path of the current of air and the short arrows the path of the particles of the foreign matter which have been separated from the air.

It will be obvious that when it becomes necessary or desirable to clean the dust-collecting element, and/or to renew the supply of liquid in the lower part of the body portion, the cover member 37, the body portion 20 and the dust-separating element can easily be separated one from the other to facilitate the operation or operations.

Figure 5:
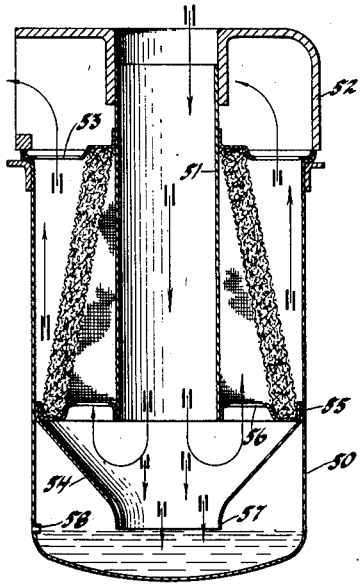
Figs 5, 6, 7, 8 and 9 are longitudinal sections through modified forms of air cleaners in which are embodied my invention.

The air cleaner illustrated in Figure 5 of the drawings consists of a body portion 50, a dust-separating element 51, and a cover member 52 which are removably secured together in the same manner as the corresponding parts of the air cleaner illustrated in the preceding figures. In construction, the body portion and the cover member of the air cleaner shown in Figure 5 do not differ from the corresponding parts of the air cleaner shown in the preceding figures. The dust separating element of the air cleaner shown in Figure 5 differs from that of the air cleaner shown in the preceding figures only in that the upper spacer 53 is of slightly different shape; and in that the baffle 54 is of frusto-conical shape and is provided on its larger end with a flange 55 which surrounds and is secured to the outer edge of the lower spacer 56, and on its smaller end with a downwardly projecting flange 57 which terminates only a short distance above the level of the lower side of the opening 58 in the side wall of the body portion.

Figure 6:
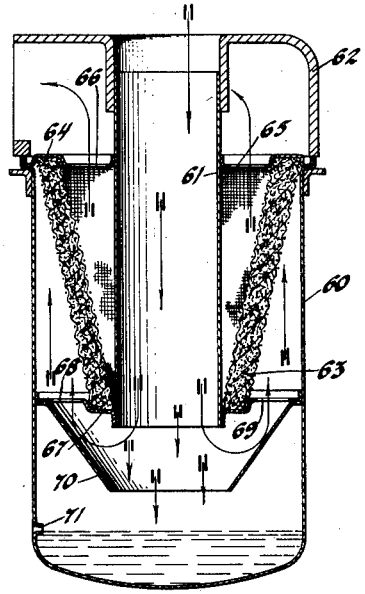

The air cleaner illustrated in Figure 6 of the drawings consists of a body portion 60, a dust-separating element 61, and a cover member 62, which are removably secured together in the same manner as the corresponding parts of the air cleaners illustrated in the preceding figures. In construction, the body portion and the cover member of the air cleaner shown in Figure 6 do not differ from the corresponding parts of the air cleaner shown in the preceding figures. The dust separating element of the air cleaner shown in Figure 6 differs from that of the air cleaner shown in Figure 5 only in that the dust-collecting element 63 is inverted and is seated at its upper end in an annular channel 64 which is provided in the upper spacer 65 outwardly of the openings 66 therein and at its lower end in an annular rabbet 67 which is provided in the lower spacer 68 inwardly of the openings 69 therein; and in the baffle 70 terminates a greater distance above the level of the opening 71 in the side wall of the body portion than, and is not flanged at its lower end, as is the baffle 54.

Figure 7:
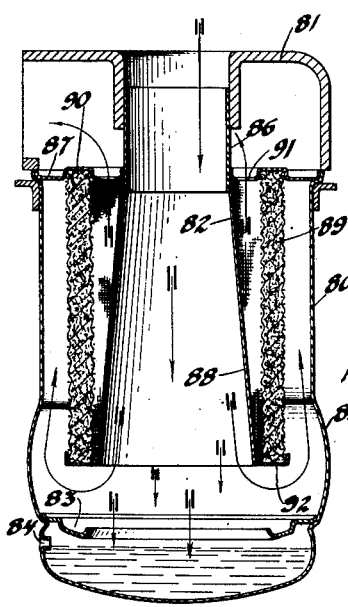

The air cleaner illustrated in Figure 7 of the drawings consists of a body portion 80, a cover member 81, a dust separating element 82, and a baffle 83. The body portion, the dust separating element and the cover member are removably secured together in the same manner as the corresponding parts of the air cleaners shown in the preceding figures. In construction, the cover member does not differ from the corresponding parts of the air cleaners shown in the preceding figures. The body portion of the air cleaner shown in Figure 7 differs from that of the air cleaners shown in the preceding figures only in that there is provided in the side wall thereof, slightly above the opening 84 therein, an annular bulge 85; and in that the baffle 83, which is similar in shape to but shallower than the baffle 28 shown in Figures 1 to 4, is seated on and secured to the side wall of the body portion adjacent the lower end of the bulge 85. The dust separating element of the air cleaner shown in Figure 7 includes a short cylindrical tube 86 which extends through and is secured to the spacer 87 and a frusto-conical tube 88 of which the smaller end surrounds and is secured to the lower end of the cylindrical tube 86. The frusto-conical tube 88 is of such length that, when the body portion and the dust separating element are assembled, the lower end of the tube is located substantially midway between the upper and lower ends of the bulge 85. The dust collecting element 89 of the air cleaner shown in Figure 7 is of cylindrical shape and its upper and lower ends are seated, respectively, in a channel 90 formed in the spacer 87 outwardly of the openings 91 therein and in an annular channel-shaped member 92 which surrounds and is secured to the lower end of the frusto-conical tube 88.

Figure 8:
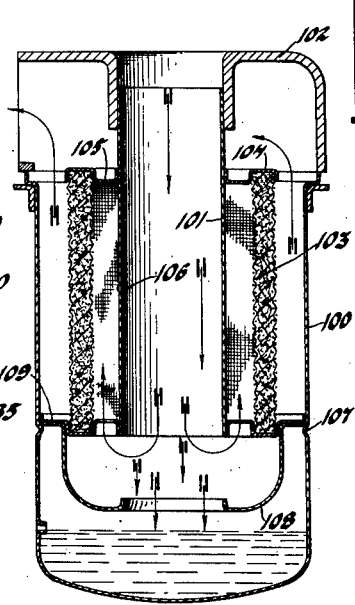

The air cleaner shown in Figure 8 of the drawings consists of a body portion 100, a dust separating element 101, and a cover member 102. The body portion and the cover member are removably secured together in the same manner as the corresponding parts of the air cleaners shown in the preceding figures. In construction the cover member of the air cleaner shown in Figure 8 does not differ from that of the corresponding parts of the air cleaners shown in the preceding figures. The dust separating element of the air cleaner shown in Figure 8 does not differ materially from the corresponding part of the air cleaner shown in Figures 1 to 4 except in that the dust collecting element 103 is of cylindrical shape and is seated at its upper end in a channel 104 in a collar 105 which surrounds and is secured to the tube 106 but does not contact with the body portion. The body portion of the air cleaner shown in Figure 8 does not differ from the corresponding parts of the air cleaners shown in Figures 1 to 6 except in that there is formed therein, intermediate its ends, an inwardly projecting annular bead 107 on which the outer edge of the baffle 108 which is secured to the spacer 109 is seated and through which the dust separating element is supported from the body portion.

Figure 9:
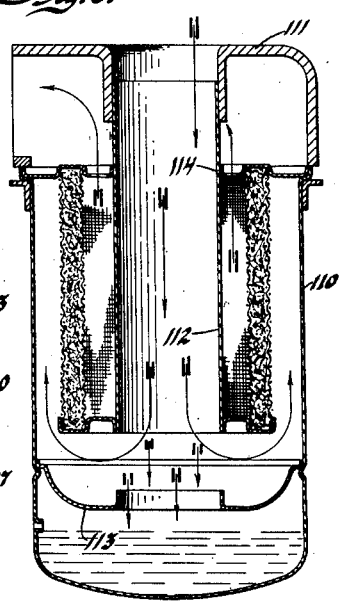

The air cleaner shown in Figure 9 of the drawings consists of a body portion 110, a cover member 111, a dust separating element 112, and a baffle 113, and does not differ materially from the air cleaner shown in Figure 7 except in that the tube 114 is of one-piece construction and is of cylindrical shape throughout its length; and in that there is provided in the body portion no bulge corresponding to the bulge 85 in the body portion of the air cleaner shown in Figure 7.

The manner in which the air cleaners shown in Figures 5 to 9 of the drawings function will be obvious from the description of the operation of the air cleaner shown in Figures 1 to 4 of the drawings, and from the arrows indicating the direction of movement of the air currents and particles of foreign matter therein.

Although I have shown and described preferred embodiments of my invention, it is to be understood that this has been done merely by way of example and not by way of limitation and that the scope of my invention is to be limited only by the appended claims.

I claim:

1. In an air cleaner, a body in which there are provided an air passage and an annular air passage surrounding the first mentioned air passage and communicating at one end with the adjacent end of the first mentioned air passage, a spacer extending between the upper ends of the walls of the passages, a spacer extending between the lower ends of the walls of the passages, and a filter element located in the annular passage between the spacers and subdividing the annular passage longitudinally.

2. In an air cleaner, a body in which there is provided an air passage and an annular air passage surrounding the first mentioned air passage and communicating at its lower end with the lower end of the first mentioned air passage, a spacer extending between the upper ends of the walls of the passages, a spacer extending between the lower end of the walls of the passages, a filter element located in the annular passage and subdividing it longitudinally, an adhesive surface located below the lower ends of the passages, and a baffle carried by the lower spacer to prevent the current of air flowing through the body from impinging directly against the adhesive surface.

3. In an air cleaner, a body in which there is provided an air passage, an annular passage surrounding the first mentioned air passage and communicating at one end with one end of the first mentioned air passage, and a frusto-conical dust collecting element located within the annular passage and bridging the space between the walls of the passages.

4. In an air cleaner, a cup-shaped body portion, a dust separating element located within the body portion and including a frusto-conical tube and a cylindrical dust collecting element carried thereby, a circumferential bulge in the body portion adjacent the larger end of the frusto-conical tube, and a baffle seated on the lower edge of the bulge.

HERBERT G. KAMRATH.